May 25, 1954     R. D. MOYER     2,679,106
APPARATUS FOR MEASURING, INDICATING, AND RECORDING
TRUE VERTICAL AND HORIZONTAL DISTANCES
Original Filed Oct. 23, 1945     3 Sheets-Sheet 3
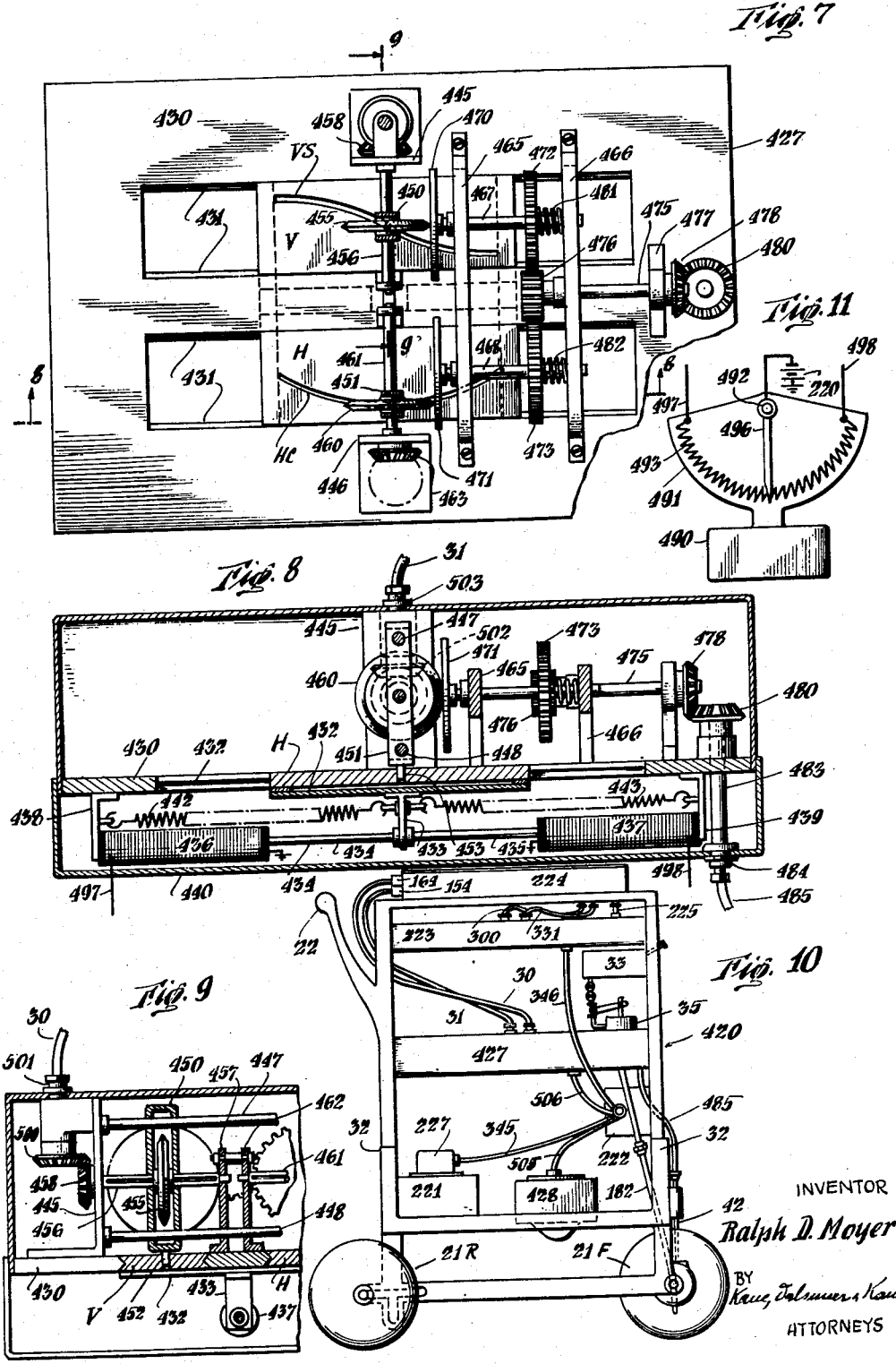
INVENTOR
Ralph D. Moyer
BY
Kane, Dalsimer & Kane
ATTORNEYS Patented May 25, 1954

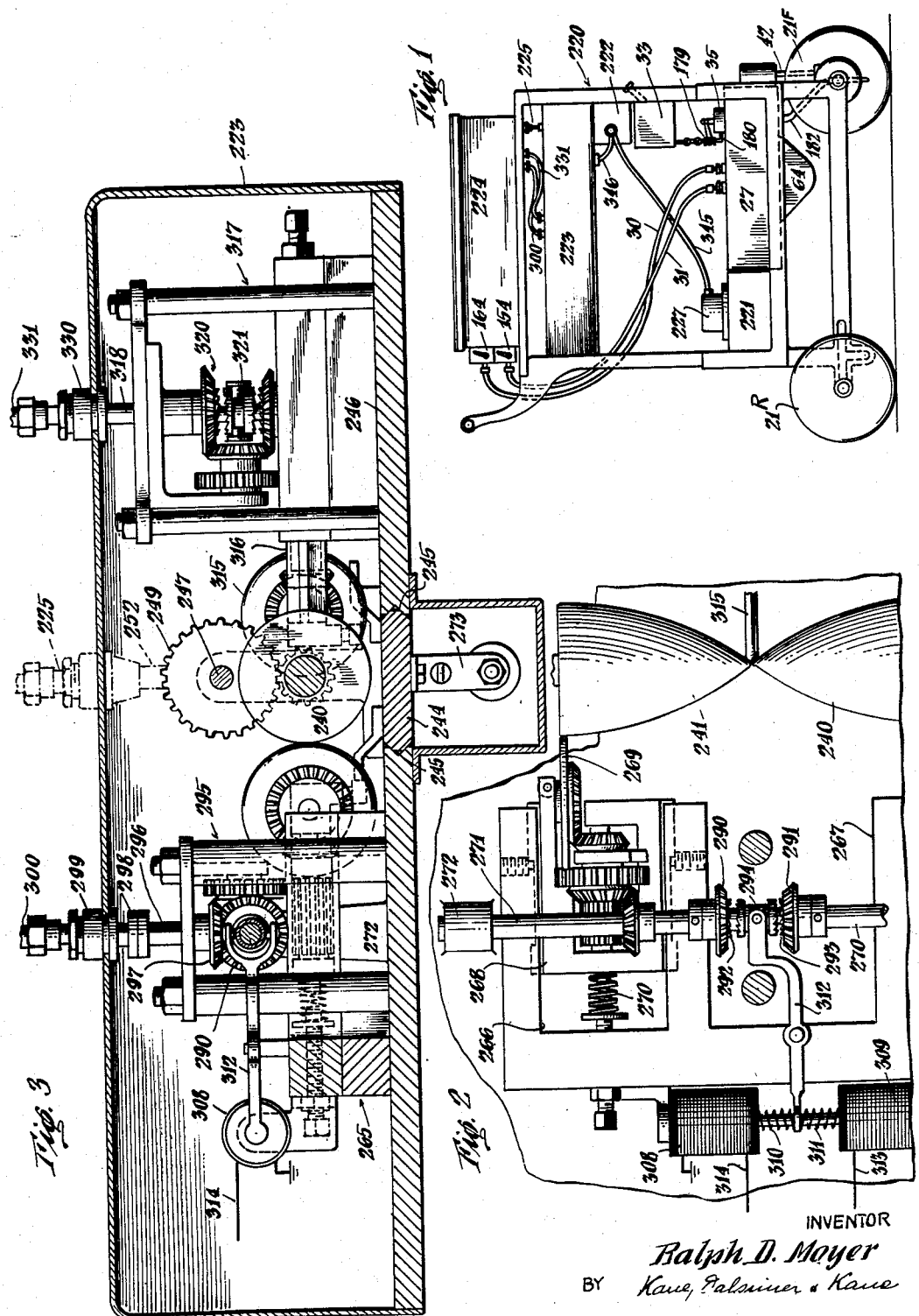

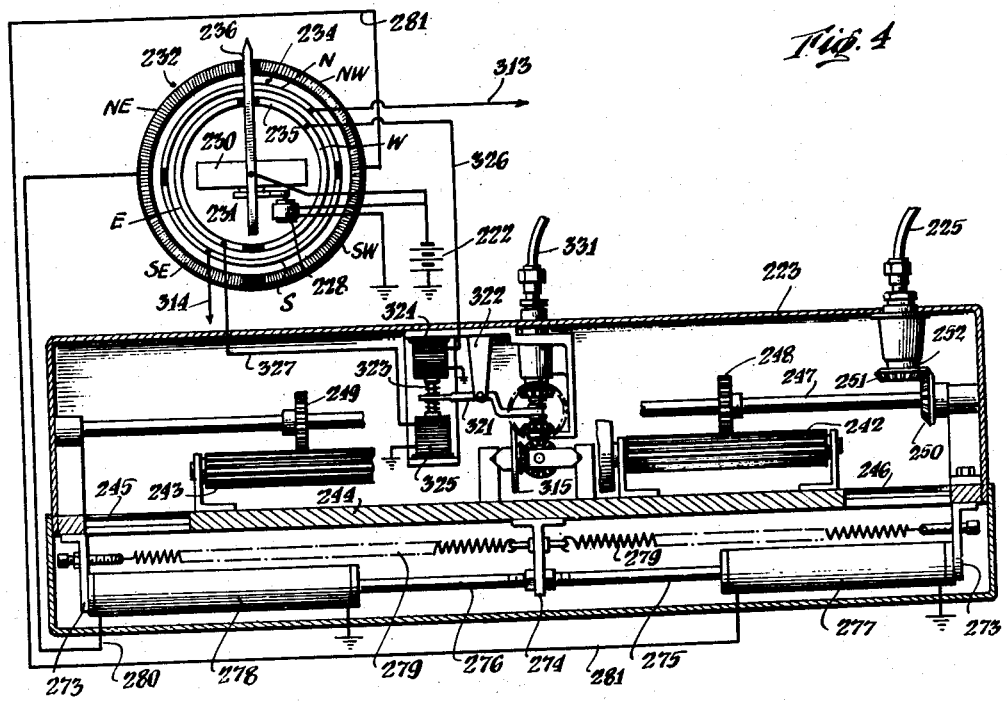
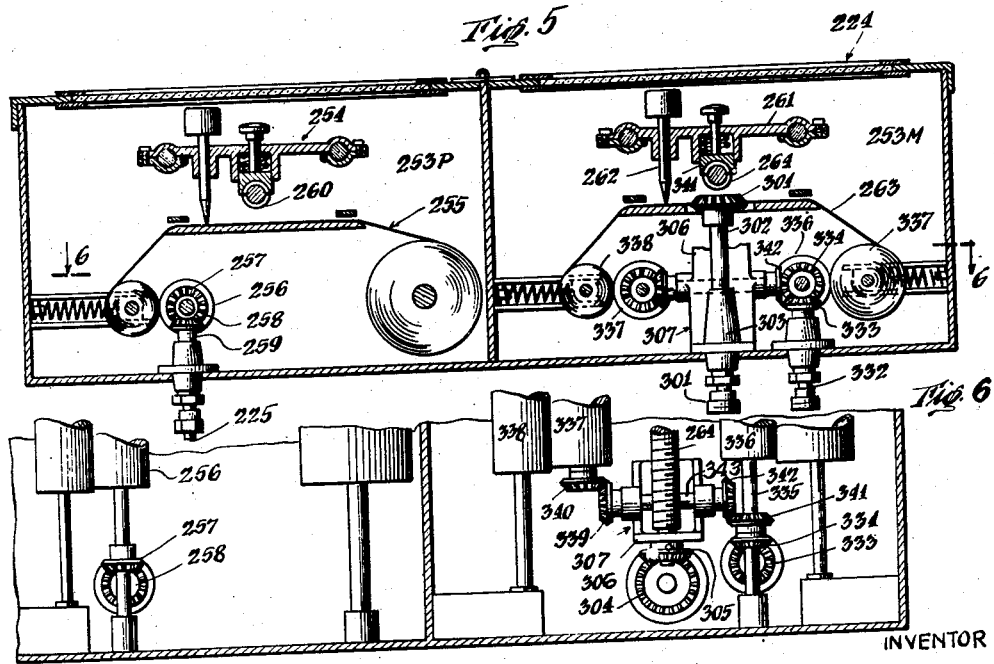

2,679,106

UNITED STATES PATENT OFFICE 2,679,106

APPARATUS FOR MEASURING, INDICATING, AND RECORDING TRUE VERTICAL AND HORIZONTAL DISTANCES

Ralph D. Moyer, Dunbar, Pa.

Original application October 23, 1945, Serial No. 623,984, now Patent No. 2,607,996, dated August 26, 1952. Divided and this application August 25, 1952, Serial No. 306,186

2 Claims. (Cl. 33—141.5)

This invention relates to mechanism for continually recording true horizontal and vertical distances and/or for continually plotting true distances and directions traversed by a vehicle in which the mechanism is mounted.

In making surveys to obtain, for example, the profile of the terrain over which a road, pipe line, or the like is to be run, it is now usual to dispatch a surveying party over the route to determine, using conventional surveying equipment, the angles and distances of ascent or descent of the proposed route. The notes and figures made by the party then serve as the basis for calculations which derive the true vertical and horizontal distances of the terrain which has been surveyed, and a profile section is then drawn to suitable scale.

Similar difficulties and tedious calculations attend the mapping of a route to show the horizontal distances and directions over which the ultimate structure is to run.

It is particularly difficult to determine the profile of submerged terrain, such as the profile of a river or harbor bed. In the latter instance, it has been necessary for the surveying party to cross the body of water in boats, taking periodic soundings, the locations of which are determined by a second group of surveyors on the river or harbor bank. Such soundings, when reduced to graphic form, show only the approximate profile or subsurface condition. Frequently unexpected depressions or obstructions will be found within the confines of the area or between selected points at which the soundings were made, and in running submerged pipe lines, for example, it has at times been necessary to reroute the pipe lines because of these unforeseen and unpredictable subsurface conditions.

The present invention affords means whereby the true vertical and horizontal distances of the proposed route may be continually and accurately plotted as a vehicle or car containing the equipment is pushed or otherwise propelled over the line of survey. For profiling, the mechanism continually determines the true horizontal and vertical distances traversed, as well as recording the actual distance of travel. For mapping, or plotting, the mechanism may additionally inscribe on a separate chart, the true horizontal projection of the distance traversed regardless of whether the mechanism has been propelled over ascending or descending paths.

As presently considered, it is contemplated that the invention will have its great applicability in profiling and sectioning, to provide a basis for earthwork computations and to afford means of economically and quickly ascertaining the status of earth-moving or earth-filling operations at periodic intervals.

It is a feature of the invention that the car containing the automatic calculator may be drawn or otherwise moved across submerged terrain, and the recording mechanism may be mounted in a boat containing the observation party. For extended underwater distances, such as wide rivers, or harbors, it is entirely feasible for a diver to push or draw the carriage over the bottom, and the actual route taken by the diver during such underwater transit is continually shown to the observation party on the surface. Hence, should the diver unknowingly deviate from the initially proposed route, his attention can be called to such deviation by intercommunicating telephone, and he can either correct his movement or explain to the observation party what sub-surface condition necessitated the deviation.

It is a principal object of the invention to provide means for continually and automatically calculating and recording true vertical and horizontal distances traversed by a carriage or the like containing the apparatus.

It is another object of the invention to provide means whereby a continuous profile, for example, may be recorded as a carriage or other vehicle containing the equipment traverses a proposed route.

It is yet another object of the invention to provide improved means whereby the relative speed and direction of movement of a stylus with respect to a plotting sheet may be continually made a function of the angle of ascent or descent of the vehicle, and/or the deviation of a vehicle from an established directional meridian.

It is another object of the invention to provide means whereby a recording mechanism may be driven at speeds proportional to the angles of ascent or descent, or deviation of the mechanism from an established meridian or pre-established direction of travel.

It is another object of the invention to provide a surveying instrument in which certain trigonometric functions of the angles of ascent or descent of a vehicle, or the course of the vehicle with respect to an established meridian, may be continually and automatically analyzed to establish the true horizontally and vertically projected distances over which the vehicle has run.

It is yet another object of the invention to provide apparatus having recorder means which will continually show the deviation of the apparatus from a horizontal plane, or from a meridian.

It is another object of the invention to provide a surveying instrument of the class described in which the means for automatically analyzing the trigonometric functions of the angles of deviation of the equipment from a vertical or horizontal plane may be separated from the recording equipment, whereby the mechanism, for example, may be run along a submerged route.

It is yet another object of the invention to provide a surveying instrument whereby at every desired unit of true horizontal distance, a suitable station mark may automatically be made on the terrain over which the instrument is travelling.

Other features and advantages will hereinafter be apparent from the detailed description of the invention which follows.

In the accompanying drawings:

Fig. 1 is a side elevation of a carriage having mounted therein a second embodiment of the invention incorporating profile and mapping calculators and recorders;

Fig. 2 is a partial plan view of the proportional-speed mechanism used for the mapping of routes traversed by the carriage;

Fig. 3 is an end elevation, specifically of the proportional-speed mechanism of the route mapping portion of the embodiment of Fig. 1;

Fig. 4 is a partial side elevational view of the proportional-speed mechanism of the route-mapping section, with the gyroscope shown somewhat schematically;

Fig. 5 is a schematic end elevation of the respective profile recording and map recording elements of the embodiment of Fig. 1;

Fig. 6 is a partial plan view of the roller drive gearing of the profile recording and map recording structures;

Fig. 7 is a plan view of a second form of trigonometric proportional-speed mechanism, which may be used alternatively with the cross sectioning or mapping mechanism of the invention;

Fig. 8 is a vertical section taken on lines 8—8 of Fig. 7;

Fig. 9 is an elevational detail taken on lines 9—9 of Fig. 7;

Fig. 10 is a side elevation of a vehicle embodying cross sectioning and route mapping devices, and embodying the Fig. 7 form of proportional-speed mechanism; and Fig. 11 is a somewhat schematic detail of the plumb weight and resistor structure by means of which the cam plates of Fig. 7 are shifted according to the ascent or descent of the vehicle.

In this invention, Fig. 1 illustrates a carriage 220 equipped with apparatus for profile-plotting, station marking apparatus, and apparatus for recording the direction of travel of the carriage. This is a division application of my copending application Serial No. 623,984, filed October 23, 1945, which became Patent No. 2,607,996, issued August 26, 1952. The profile-plotting apparatus is essentially the same as that described in my above mentioned application. In the carriage 220 a gyrocompass unit housing 221 is positioned on the lower carriage chassis, and a storage battery 222 is mounted over a reservoir 32. The proportional-speed mechanism for the mapping portion is contained in a housing 223 immediately beneath a modified chart housing 224, and is connected therewith by three preferably flexible drive shafts, as later explained.

In service, it is obvious that the apparatus will traverse routes that will be hilly and curving, and in order properly to map the route, the horizontal projections of the actual slopes must be continuously derived, and the directional components of an angular course must also be determined. Sine-cosine cones are employed to break the course down with its directional components, and such cones are driven from the chart-drive roll of the profile recorder. Hence, the cones revolve at a speed which is always indicative of the horizontal component of the travel of the carriage 220. True north is established by means of a conventional gyrocompass connected to and driven from the storage battery 222. Fig. 4 somewhat schematically shows the gyrocompass in which the electric motor 228 and gyro wheel 230 are mounted on a turn table 231 supported on anti-friction bearings (not shown). It will be understood that the gyrocompass assembly and housing 221 are completely water-tight to permit the carriage 220 to be transported across the underwater line of survey. As is well known, the gyrocompass will effectively resist any deviation from its established north-south axis of rotation, and hence the position of the rheostat 232 and the respective contact rings will change with respect to a contact brush 236 insulatedly carried by the gyro turntable 231 as the carriage deviates to the right or left of the established meridian. This action is much the same as that of a boat with respect to its compass. Although the compass card appears to swing, it is actually the boat which revolves about the compass card.

The gyrocompass, rheostat, and the contact rings are used to effect changes in direction and speed of movement of a recorder chart, and direction and speed of movement of a stylus carriage associated therewith, all as later explained.

Within the chamber 223 are supported, see Fig. 2, a pair of sine-cosine cones 240, 241, carried on shaft extensions of gears 242, 243, mounted on a bed plate 244 slidably supported within trackways 245 formed in the base plate 246 of the housing 223. Extending axially above said gears and journaled in suitable bearings is a shaft 247 fixed to which are the respective gears 248, 249 which mesh respectively with the elongate gears 242, 243. One end of shaft 247 has fixed thereto a bevel gear 250 in mesh with a mating gear 251 fixed to the end of a stub shaft 252 which extends upwardly through a gland in the upper part of housing 223, where connection is made to preferably flexible shaft 225.

Referring now to Fig. 5, the chart housing 224 is divided into two sections, in one of which 253P, there is located a profile-plotting chart and therewith associated equipment for the illustrated stylus carriage 254 and chart 255 which are driven by the cables 30, 31, through gear boxes 164, 154. The other section, 253M, contains the chart, stylus carriage and associated drive equipment for mapping. The profile-chart drive roll 256 is provided with a bevel gear 257 which meshes with a cooperating gear 258 fixed to the one end of a shaft 259 which extends downwardly through a gland at the bottom of the housing and connects with the other end of shaft 225. It will be understood that chart drive roll 256 and the stylus carriage worm 260 are driven from the proportional-speed cone drive in the housing 27. For simplification, the drive means from housing 27 to the chart roll and stylus worm have been eliminated from Figs. 5 and 6. It may be assumed that such drive means are at the opposite ends of housing section 253P. Shafts 259, 225, 252, 247, and hence the cones 240, 241, are thereby driven at speeds which correspond to the speed of true horizontal movement of the carriage 220, regardless of the slope of the terrain over which the apparatus is moving.

In the mapping section 253M means are provided to move the stylus carriage 261 and its associated stylus 262 lengthwise of the chart table, for north and south travel of the apparatus. This is accomplished by rotation of the worm 264 in one or the other direction by a reversible drive, later explained. Means are provided to move the chart in either direction beneath the stylus, for east-west movement of the apparatus.

The drive means for the stylus carriage comprises a proportional speed mechanism which includes a frame 265 mounted on the base plate 246 and having a pair of trackways or guides, one of which, 266, is shown fully in Fig. 2. But a portion of the other, 267, is shown. Each of said trackways slidably supports a carriage, such as 268, at one end of which is a drive wheel 269 engaging with the adjacent sine-cosine cone 241. It will be understood that a second carriage (not shown) carries a drive wheel for cooperation with the second cone 240. A spring 270 urges the carriage 268 in the direction of the cone, and stop means, guide rails, and the like are provided. By spur and bevel gearing, as shown in Fig. 2, the rotation of wheel 269 is transmitted to the horizontally disposed shaft 271 supported in posts 272. It will be understood that a second organization of gearing connects the counterpart of wheel 269 to shaft 271, and hence said shaft is also driven by rotation of the said counterpart of wheel 269 when said wheel engages with the cone 240.

Movement of the cones relative to the wheel 269 and its counterpart is accomplished, in the present instance, by solenoid organization mounted on suitable brackets 273 which are fixed to the base plate 246 in the line of the center axis of the bed plate 244. A bracket 274 extending downwardly from the center point of the bed plate adjustably carries oppositely extending soft iron cores 275, 276 which extend freely into the respective solenoid coils 277, 278. A pair of equal-tension springs 279 connect from the bracket 274 to the respective coil supporting brackets 273. With the solenoid coils deenergized, the springs position the bed plate 244 so that the drive wheel 269 and its counterpart are at the extreme ends of the cones; in other words, the cones are centered with respect to the drive wheels.

The solenoids are deenergized so long as the carriage is travelling in a true north or south direction, for in such direction of travel it is obvious that the stylus carriage 261 should be moving at maximum speed with respect to the chart 263.

Referring now to Fig. 4, it is seen that the rheostat 232 is divided into four quadrants, respectively designated NE, SW, SE, NW, with insulation between the quadrants NE, NW, and SE, SW. As is shown from the circuit diagram of Fig. 4, the brush 236, when the carriage is progressing due north, occupies one of the insulation spaces between the NE and NW rheostat segment and hence no current will flow to either solenoid. As the carriage is moved in an easterly direction, the rheostat, fixed to the carriage, will move clockwise with respect to the brush 236, and the brush will contact to the NE portion of the rheostat, to an amount which depends upon the extent of deviation from north. Current will then flow from the battery 222 through the brush and rheostat quadrant NE, through conductor 280 to solenoid 278 to ground. The solenoid will be energized to an extent depending upon the effective resistance of the NE quadrant and will attract its core 276 moving the sub-base and associated cones to the left of Fig. 4. The cone 241 will be the effective drive cone and drive wheel 269 will take up a position along its surface which is equal to the amount of movement of the sub-base. Drive wheel 269 will rotate at a slower speed because it engages with a reduced-diameter portion of the cone and will slow the travel of the stylus carriage, as later explained.

For due easterly travel, the brush 236 will bridge the respective rheostat quadrants NE and SE and full power would be transmitted to rheostat 278. The sub-base and associated cones will be moved to their extreme position until the drive wheel 269 is positioned at the apex of cone 241 and the wheel, theoretically, will have no rotation. As the carriage proceeds in a more southerly direction, the resistance of the SE quadrant increases, decreasing the power of solenoid 278, and permitting the springs 279 to reverse the direction of movement of the cones until, at due south, the wheel 269 would again be at the point of maximum diameter of cone 241.

Similarly, if the carriage took a course to the west of north, a portion of rheostat NW would contact the brush 236, and current would flow through conductor 281 to solenoid 277, shifting the sub-base and thereon mounted cones in the opposite direction wherein cone 240 would drive the counterpart of wheel 269.

The power of solenoid 277 is similarly increased until at due west, the solenoid has maximum power and the said drive wheel is at the apex of cone 240. Proceeding from due west to south, the power of solenoid 277 is progressively less until, at due south, neither solenoid would be energized and the respective drive wheels would again have maximum speed of rotation.

Shaft 271, as previously explained, is driven by either drive wheel through the gear train. The shaft mounts idler gears 290, 291, each of which has a clutch tooth portion, respectively 292, 293. Splined on the shaft 271 is a clutch 294, the teeth of which may engage with the teeth on either gear 290 or 291. A frame 295 fixed to the base plate 246 rotatably supports a shaft 296 having a bevel gear 297 which is in continuous mesh with the respective gears 290, 291. The shaft 296, as well as all shafts passing through the upper wall of the housing, may have a coupling 298. The shaft extends through a gland 299, and couples to a drive shaft 300, which at its opposite end connects to the gland nut 301 beneath housing 253M. Shaft 302 extending through the gland 303, and thereby driven by shaft 300, has a bevel gear 304 meshing with a gear 305 fixed to the end of worm 264. Said worm 264 may be journaled in a vertical wall 306 of a bearing bracket 307.

The stylus carriage may be assumed to proceed vertically up the chart for northerly directions of travel of the carriage, and in reverse directions for southerly directions of travel. The reversal of rotation of direction of movement of the shaft 302, and hence of the worm 264, is accomplished by shifting the clutch 294 to engage with either of the idler gears 290 or 291.

The shift of the clutch is accomplished by means of solenoids 308, 309, the armatures or cores of which are normally held in neutral position by the springs 310, 311. At the middle point of the armatures there is affixed a pivoted clutch shaft lever 312 the forked end of which rides in the peripheral groove of clutch 294, as appears in Fig. 3.

Contact ring 234 is divided into two mutually insulated, semi-circular segments, respectively designated N and S. A conductor 313 connects the N segment with the solenoid 309, whereas conductor 314 connects the S segment with solenoid 308. Hence, with the carriage travelling in a northerly direction, i. e., in any direction northerly of due east or due west, the brush 236 is in contact with the N segment and battery power is transmitted to solenoid 309, energizing the solenoid and throwing the clutch so that the shaft 296 rotates the worm 264 in a direction which will cause the stylus carriage to travel up the chart.

Conversely, for any southerly direction of travel, the S segment is engaged by the brush 236 to energize the solenoid 308 and throw the clutch for a reverse direction of the worm 264.

The single wheel 315 is carried upon the slidable carriage 316, which is supported in frame 317. The wheel 315 engages with and is driven by either cone 240 or 241 for the purpose of recording the east-west components of travel of the carriage. The solenoids 277, 278 are independently energized according to whether the carriage is moving in an easterly or westerly course, and depending upon the course, the wheel 315 engages with either of the cones. The clutch assembly and gearing for translating the rotation of the wheel 315 into one or another direction of rotation of the shaft 318, and the clutch assembly, and gearing, in its entirety has been designated 320. In the present embodiment, the clutch is thrown electromagnetically and, therefore, the clutch shift lever 321 is pivoted to a post 322 and is secured to the mid-point of spring-balanced solenoid cores 323 (Fig. 4) which cooperate with the respective suitably supported solenoids 324, 325.

As clearly appears in Fig. 4, the coil 324 is connected by means of conductor 326 to the westerly segment W of the contact ring 235, whereas the coil 325 connects through conductor 327 to the segment E of the said ring. Hence, as the carriage proceeds in an easterly direction, the entire assembly of the rheostat 232 and the respective contact rings will rotate clockwise relatively to the fixed position of brush 236, and current will flow from the battery through brush 236, and E segment, then through conductor 327 to energize solenoid 325. This will pull the solenoid core downwardly and will rotate the clutch lever 321 counterclockwise and the clutch member will engage the uppermost idler of the clutch assembly 320 and will correspondingly rotate the shaft 318.

The shaft 318 passes through a gland 330 to a fitting which provides for connection to a shaft 331 which connects, at its opposite end, to the stub shaft 332 extending through the illustrated gland in the base of the housing section 253M. By the illustrated bevel gearing 333, 334, the rotation of shaft 332 is transmitted to the drive shaft 335 of chart drive roll 336 frictionally engaging chart roll 337. A second chart drive roll, 338, is provided and is driven from the same shaft 332 through a second assembly of bevel gearing, 339, 340. Said gearing is driven from gearing 341, 342 at one end of shaft 343 supported in bracket 306, as clearly appears in Figs. 5 and 6. The purpose of the second drive roll 337 is to afford means whereby the direction of movement of the chart 263 beneath the stylus 262 may be reversed as the course of the carriage changes from easterly to westerly. As the course changes to westerly it will be obvious that the W segment of the ring 235 will energize the solenoid 324, rotating the clutch lever 321 clockwise of Fig. 4 so that an opposite direction of movement of shaft 318 will result, with a reverse movement of travel of chart 263 beneath the stylus.

In the foregoing description, it has been assumed that the gyroscope has been set so that the brush 236 points to geographical north. Hence, the stylus carriage travels vertically up and down the chart for northerly and southerly courses taken by the apparatus. It is apparent that for a long northerly or southerly course, the stylus would come to the ends of the chart and would have to be reset as by raising the stylus carriage gear segment 344 out of engagement with the worm 264 and shifting the carriage 261 to a new position on the chart.

For long northerly or southerly courses, the chart will therefore show a succession of substantially vertical lines spaced along the chart. Therefore, when the line to be surveyed or mapped is predominantly northerly or southerly, it may be preferable to set the axis of rotation of the gyroscope so that the brush 236 points geographically easterly or westerly, whereupon the chart 263, and not the stylus carriage, records the north-south directions of travel. Hence, the stylus will not have to be reset until the entire length of the chart paper roll has been unwound.

The apparatus of this embodiment also provides for submarine surveys through the expedient of separating carriage 220 and increasing the lengths of electric cable 345 from gyro to battery 222 and the lengths of flexible cable 30, 31 connecting the proportional speed housing to the profile-plotting housing 224. The short length of cable 346 from the batery to housing 223, as well as the respective flexible-shaft drives 225, 300 and 331, need not be changed because these elements are all located above the point of separation of the carriage 220.

It will be understood, of course, that the cables 345, 346 are multiple-conductor cables, containing all conductors necessary for the gyroscope and solenoid lead wires.

Figs. 7 through 11 show another embodiment of the invention, utilizing cam track means in lieu of sine-cosine cones for effecting the trigonometric proportional-speed drive. Fig. 10 shows a carriage equipped with cross-sectioning and mapping apparatus as previously described with respect to Figs. 1 through 6, and as such, all apparatus in common with Figs. 1 through 6 have been given identical reference characters. The modified carriage 420, Fig. 10, is equipped with a superstructure assembly which may be separated from the lower chassis assembly, as at the demountable joints 32.

The apparatus of Fig. 10 has, in lieu of the water-tight chamber 27 of Fig. 1, a modified chamber 427 located in the upper superstructure portion of the carriage, and the vehicle 429 has, within a water-tight chamber 428 on the lower chassis portion, a plumb weight organization which actuates a resistance and contact plate, as presently described.

Referring now to Fig. 7, the base plate 430 of chamber 427 is provided with a pair of spaced parallel trackways 431, 431 within which are slidably mounted cam plates V and H which are tied together by a cross member 432 for conjoint sliding motion in the direction of travel of the vehicle 420. Extending downwardly from the geometric center of plate 432 so that it will be in line with the transverse center lines of plates V and H, is a bracket 433, fixed to which are the cores 434, 435, of the respective solenoids 436, 437, fixedly supported in brackets 438, 439, secured to and extending downwardly from the base 430. A water-tight housing 440 encloses the solenoid assembly. Springs 442, 443, of equal strength, are fixed at one end to the respective brackets 438, 439, and at their opposite ends to the bracket 433. The springs are so tensioned that with equal power in both solenoids, the bracket 433, and hence the respective plates V and H, will be on center.

Plate V has a cam track VS which represents a sine curve over the angular range of from 90 degrees to 270 degrees, whereas plate H has a cam track HC which represents a cosine curve over the angular range of from 90 degrees to 270 degrees.

A pair of brackets 445, 446 fixed to plate 430 at opposite sides of the plates V and H support parallel guide rails 447, 448, which are in a vertical plane passing through the midpoint of the respective cam tracks when the carriage, and hence the chamber 427, is on a horizontal plane. Arranged to ride along said guide rails are a pair of sliding frames 450, 451 which respectively have pins 452, 453 which ride within the respective cam tracks VS and HC.

Disposed within the frame 450 is a wheel 455, splined to a shaft 456, one end of which is journaled in a bracket 457, and the opposite end of which extends through bracket 445 and has mounted thereon a bevel gear 458. The shaft 456 is in the plane which passes through the centers of the guide rails 447 and 448.

Similarly, the frame 451 rotatably carries a wheel 460, the splined shaft 461 of which is journaled at one end in a bracket 462 and at the opposite end in the bracket 446; said shaft 461 terminates in a bevel gear 463. Shaft 461 is likewise in the vertical plane of the guide rails 447 and 448.

A pair of bridge members 465, 466, which are supported upon the plate 430 and straddle the respective plates V and H as shown in Fig. 7, rotatably mount shafts 467, 468 which are in the longitudinal center line of the respective plates V and H. Projecting forwardly from the bridge 465, and fixed to the ends of shafts 467, 468, are plane surfaced wheels 470, 471 which are respectively in contact with the wheels 455 and 460. Shaft 467 has fixed thereto a gear 472 and shaft 468 has a precisely similar gear 473. The bridge 466 supports one end of shaft 475 which carries a gear 476 in continuous mesh with the respective gears 472, 473. The opposite end of shaft 475 is journaled within a bracket 477, and carries a bevel gear 478 in mesh with a second gear 480. The respective shafts 467 and 468 are slidably journaled in the respective bridge members, and are urged in the direction of the wheels 455 and 460, as by the coil springs 481, 482.

As shown in Fig. 8, the gear 480 is at an end of a suitably journaled shaft 483 which passes through a gland 484 to connect with a flexible drive cable 485. Said cable 485 connects with and is rotated by the shaft 42 which in turn is operatively associated by suitable gearing with the wheel 21F for rotation as the carriage traverses the route to be surveyed.

It will be seen, therefore, that as the carriage is propelled along the line of survey, the flexible shaft 485 will, through the gearing 480, 478, rotate shaft 475 and, through the illustrated gear train, will cause the shafts 467, 468 and their associated wheels 470, 471 to rotate. The wheel 455 is in contact with the wheel 470 and so long as the said wheel is not at the precise center of wheel 470, rotation of the latter wheel will cause wheel 455 to rotate. Similarly, so long as wheel 460 is not at the precise center of rotation of wheel 471 the latter wheel will cause wheel 460 to rotate.

It will be understood that the points of contact of wheels 455 and 460 with their associated driving wheels 470 and 471 is along a line which passes through the centers of rotation of said driving wheels.

It is apparent that as the cam plates V and H are moved to the left or right of Fig. 7, the frames 450 and 451 will shift the wheels 455 and 460 over the surface of the respective drive wheels 470 and 471, and the wheels 455 and 460 will have a speed of rotation proportional to the distance which the said wheels are from the centers of rotation of their driving wheels. Inasmuch as the respective cam tracks represent trigonometric functions, the speeds of rotation of the wheels 455 and 460 will be proportional to the trigonometric functions represented by the position of the respective cam plates. When the vehicle is traversing a horizontal plane, it is apparent that the wheel 455, representing the vertical component of movement of the vehicle, should have no rotation, whereas the wheel 460, representing the horizontal component of travel of the vehicle, should have maximum speed of rotation.

The movement of the respective cam plates V and H according to the angle of inclination or declination of the vehicle 420 is effected by regulation of the power input to either of the solenoids 436 or 437. Such regulation is by means of a plumb weight 490 having affixed thereto a segment 491, which is of insulation material, or faced with insulation material. The plumb weight and segment are pivotally suspended from a shaft 492 extending transversely of the direction of movement of the vehicle, the said plumb weight and its associated segment being contained within the chamber 428 on the lower chassis section of the vehicle. The insulating segment 491 carries a rheostat 493. A brush 496 is fixed so that with the vehicle on a horizontal plane it is at the mid-resistance point of the rheostat 493. As the carriage traverses an ascending slope, the left hand portion of the resistance 493 will engage with the grounded brush 496. Considering initially the effect of the change in effective resistance of rheostat 493, it would be noted that the lead 497 connects to the solenoid 436 and the lead 498 connects to the solenoid 437. With the carriage on a horizontal plane, the same amount of voltage flows from the battery 220 to each solenoid, and the bracket 433 is, therefore, held at midposition. As the vehicle enters on the ascending slope and the left hand portion of rheostat 493 contacts the brush 496, there will be less resistance in the circuit to solenoid 436 and more in the circuit to solenoid 437; hence, solenoid 436 will exert a net pull on the cores 434 and 435 which will cause the bracket 433 to shift to the left on Fig. 8, and hence move the plates V and H to the left of Fig. 7. Cam track HC will, through the frame 451, move the wheel 460 toward the center of wheel 471, and hence said wheel 460 will have a slower speed of rotation. The movement of plate V, however, will cause the cam track, acting through the frame 459, to shift the wheel 455 away from the center of drive wheel 470, i. e., downwardly as viewed in Fig. 7 to an amount equal to the natural sine of the angle of ascent, and hence the wheel 455 will be driven by wheel 470 at a speed which is proportional to said natural sine.

Similarly, if the vehicle were to enter on a descending slope, solenoid 437 would receive more power than solenoid 436, and the cam plates would be drawn to the right of Fig. 7. Slot HC would cause wheel 460 to be moved toward the center of wheel 471, and cam slot VS would cause the wheel 455 to be moved upwardly of Fig. 7 to assume a new position across the center of wheel 470 in proportion to the extent of angle of descent of the carriage. It is obvious that as wheel 455 travels beyond the center of wheel 470, it, and its shaft 456, will have an opposite direction of rotation.

The gear 458 rotated by shaft 456 meshes with a gear 500 suitably supported on the bracket 445, and driving the flexible shaft 30 through the water-tight gland 501. The shaft 30 connects, as in the previous embodiments, to the stylus carriage drive worm of the cross section chart portion of the apparatus. It will be understood that the flexible shaft 30 drives said stylus carriage worm through the gear change mechanism 164 as previously described.

Gear 463 meshes with and drives a gear 502 suitably supported in the bracket 446 and connected through the water-tight gland 503 with the flexible drive cable 31 which, as in the previously described embodiments, motivates the chart drive means of the cross section chart portion of the apparatus, said drive being through the gear change mechanism 154 shown in Fig. 10.

It is apparent that the cam plates H and V with their trigonometric cam slots may be utilized wherever the sine-cosine cones have been shown in the previous embodiments. For example, in the embodiments of Figs. 1 through 6, the sine-cosine cones 241 and 246, which are driven from the chart drive mechanism and the profile-plotting or cross-sectioning portion of the machine, may be replaced by the assembly illustrated in Figs. 7 and 8, the drive of the gear 476 thereof being from the cross-section chart drive mechanism.

It will be noted that it is not necessary to have a reversing clutch in the drive 30 for the reason that the wheel 455 automatically reverses its direction of rotation as it passes from one side to the other of the center of wheel 470 corresponding to a shift from an ascending to descending path of travel of the vehicle.

The embodiment last described has a practical advantage over the previous embodiment in that the major part of the proportional-speed and plotting mechanisms are located on the demountable superstructure portion of the vehicle. The lower chassis portion contains only relatively compact and easily sealed apparatus, and the only elements which require alteration as the vehicle is separated to permit an underwater survey are the electrical cables 345 and 505 which connect the battery with the electrical apparatus of the last described embodiment. It will be understood that the station-marking conduit 182 must be broken and plugged when underwater surveys are to be made, and that the flexible cable 485 must be appropriately lengthened. When heavy conductors are used in the respective cables, the difference in the conductor resistance for changes in cable length up to 100 ft. will probably be so negligible that the operation of the various electrical devices will not be noticeably affected. For longer cable lengths, or for cables employing smaller gauge conductors, it may be necessary to equip the apparatus with an adjustable resistance so that under all conditions of use the increasing or decreasing cable lengths may be compensated to provide an approximately uniform total resistance.

Although the invention has been described by making a fully detailed reference to the certain presently preferred embodiments, such detail of description is to be understood in an instructive rather than a limiting sense, many changes being possible within the scope of the claims hereto appended.

What is claimed is:

1. Apparatus for rotating shaft means at speeds proportional to a trigonometric function, comprising a vehicle having at least one rotatable ground contacting member of known circumference; a drive wheel rotated by said ground contacting member of known circumference; a cam mounted in said vehicle and movable therein in directions parallel to the direction of travel of said vehicle; said cam having a cam surface representing a curve derived by plotting a trigonometric angular function over an angular range including the total expected angular deviation of said vehicle from a predetermined normal path of movement; a shaft-drive wheel engaging with and driven by said first named drive wheel, said wheel rotating in a plane intersecting the plane of said drive wheel and being operatively associated with said shaft means to rotate the same; slidable support means for said shaft-drive wheel and having cam follower means cooperating with said cam surface, said support means being guided for movement parallel to the plane of rotation of said drive wheel, whereby movement of said cam effects movement of said shaft-drive wheel across the face of said drive wheel; means including solenoid means for moving said cam means; and means for regulating the power exerted by said solenoid according to the angular deviation of said vehicle from travel in a predetermined normal path.

2. Apparatus for rotating shaft means at speeds proportional to a trigonometric function, comprising a vehicle having at least one rotatable ground contacting member of known circumference; a drive wheel rotated by said ground contacting member of know circumference; a cam mounted in said vehicle and movable therein in directions parallel to the direction of travel of said vehicle; said cam having a cam surface representing a curve derived by plotting a trigonometric angular function over an angular range including the total expected angular deviation of said vehicle from a predetermined normal path of movement; a shaft-drive wheel engaging with and driven by said first named drive wheel, said wheel rotating in a plane intersecting the plane of said drive wheel and being operatively associated with said shaft means to rotate the same; slidable support means for said shaft-drive wheel and having cam follower means cooperating with said cam surface, said support being guided for movement parallel to the plane of rotation of said drive wheel, whereby movement of said cam effects movement of said shaft-drive wheel across the face of said drive wheel; means including solenoid means for moving said cam means in an amount proportional to the angular deviation of said vehicle from travel in said predetermined normal path; rheostat means in circuit with the solenoid; and means for establishing the effective resistance of said rheostat means according to the angular deviation of said vehicle from travel in a predetermined normal path.

References Cited in the file of this patent

UNITED STATES PATENTS

| Number | Name | Date |
| --- | --- | --- |
| 616,878 | Batson et al. | Jan. 3, 1899 |
| 1,062,929 | Rozic | May 27, 1913 |
| 2,136,944 | Hart | Nov. 15, 1938 |
| 2,149,440 | Jackson | Mar. 7, 1939 |
| 2,208,707 | Spitzer | July 23, 1940 |
| 2,337,044 | Holmes et al. | Dec. 21, 1943 |